No. 782,204. Patented February 7, 1905.

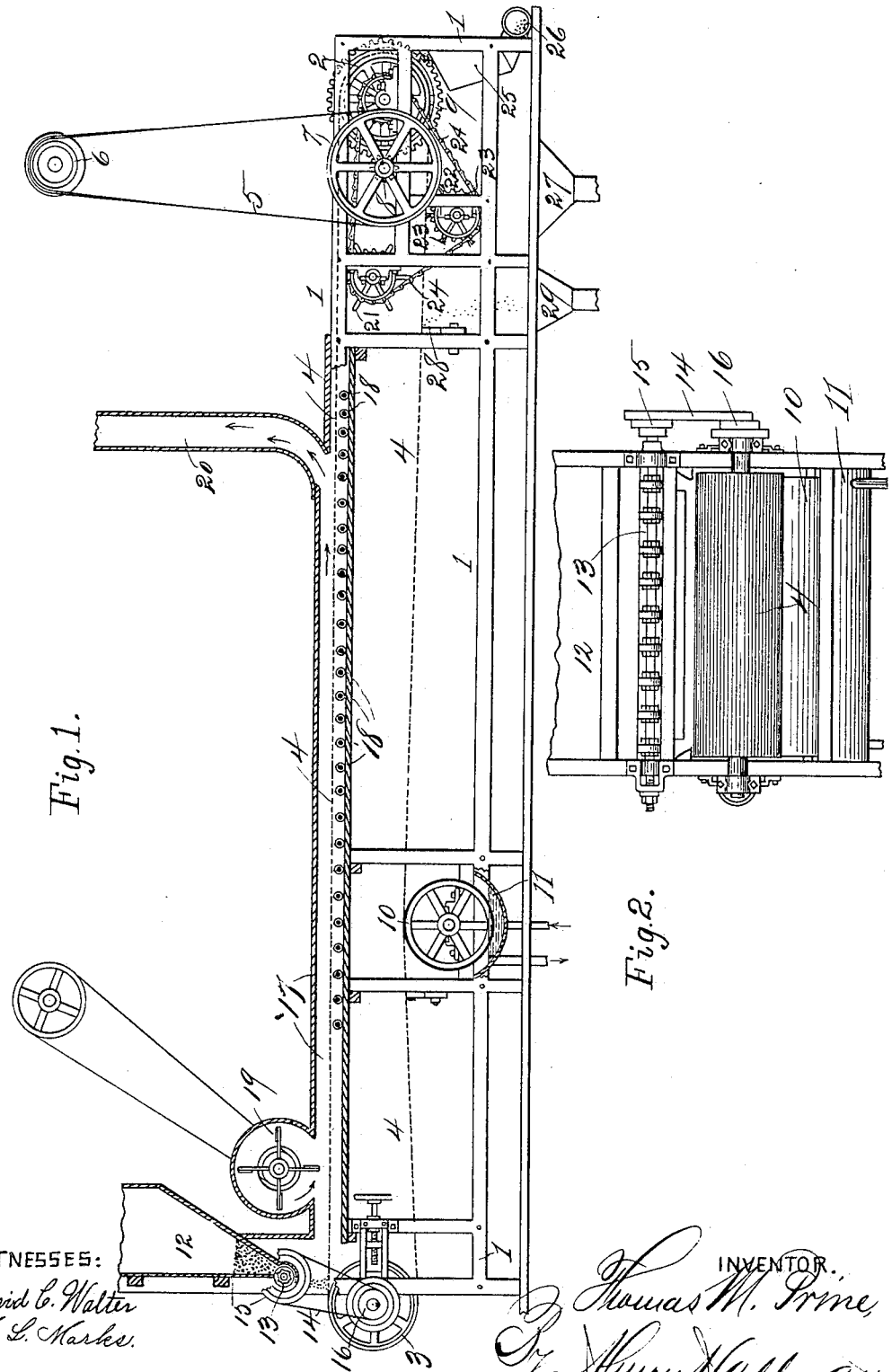

UNITED STATES PATENT OFFICE.

THOMAS M. PRINE, OF TOLEDO, OHIO.

PROCESS OF SEPARATING SEEDS.

SPECIFICATION forming part of Letters Patent No. 782,204, dated February 7, 1905.

Application filed June 6, 1904. Serial No. 211,318.

*To all whom it may concern:*

Be it known that I, THOMAS M. PRINE, a citizen of the United States, residing at Toledo, in the county of Lucas and State of Ohio, have invented a certain new and useful Process of Separating Seeds; and I do declare the following to be a full, clear, and exact description of the invention, such as will enable others skilled in the art to which it appertains to make and use the same, reference being had to the accompanying drawings, and to the figures of reference marked thereon, which form a part of this specification.

In raising clover the greatest trouble encountered by the farmer is a noxious weed—a species of plantain variously known as "ribwort," "ripple-grass," and "buckhorn," the latter being its familiar name among dealers in clover-seed. In preparing clover-seed for the market and for sowing it is now quite practicable by means of modern machinery to separate the clover-seed from all foreign seeds and substances save the seeds of the weed referred to; but these seeds are so nearly like the clover-seed in size, weight, form, and specific gravity that the mechanical separation of the two has heretofore been found impossible. The fact that the presence of five per cent. of buckhorn in a bushel of clover-seed sometimes diminishes its market value as much as seventy-five per cent. will illustrate the gravity of the difficulty here pointed out.

My invention has for its object a process by means of which the difficulty above indicated may be overcome.

I have discovered that the objectionable seeds above referred to contain at or near their surface a substance which upon being moistened becomes mucilaginous or viscid and adhesive and that in clover-seed this property is wholly absent. In practicing my process I avail myself of this difference between the two kinds of seeds. When the mixed seeds are slightly moistened, the weed-seeds immediately become sticky and will adhere to any object with which they are brought into contact. Now if the seeds be immediately dried the two varieties of seeds may be readily separated, as the clover-seed will by its own weight drop off from the holder upon which it was dried, while the other seeds will adhere to the holder. If any of the clover-seeds should by contact with the other seeds or with the sticky holder fail to drop off the holder, they may be dislodged by either jarring or slightly brushing the holder, or both. The clover-seed having been thus recovered, the other seed may now be removed from the holder by scraping or otherwise.

I have found in practice that my process may be rapidly and economically practiced with complete success and without the slightest injury to the clover-seed by means of an apparatus which I will now describe and which is illustrated and shown in the accompanying drawings, in which—

Figure 1 is a side elevation of my machine, and Fig. 2 an end elevation of the same seen from the left in Fig. 1.

Like numerals of reference indicate like parts in both views.

In the drawings, 1 is an elongated frame having at one end a drum or pulley 2 and at its other end a drum or pulley 3. Upon these two pulleys travel an endless belt or apron 4, composed of stout canvas or other suitable fabric or flexible material. The belt 4 is driven by a driving-belt 5 on a pair of cone-pulleys 6 7, which permit adjustment of the speed of travel of the belt 4. On the shaft of pulley 7 is a pinion 8, which meshes with and drives gear-wheel 9 on the shaft of drum or pulley 2. The bottom part of the horizontally-traveling belt 4 passes over a roller 10, journaled in the frame of the machine. This roller is covered with felt. The bottom of the roller 10 is immersed and travels in a tank of water 11.

12 is a hopper into which is fed the seed to be treated. In the mouth of the hopper, which is as wide as the belt 4, is a feed-wheel 13, which feeds the seed evenly upon the moving belt below. This feed-wheel is driven by a belt 14 upon a cone-pulley 15 upon the shaft of the feed-wheel and a cone-pulley 16 upon the shaft of the drum 3. By means of this pair of cone-pulleys the feed of seed upon the belt 4 is regulated as may be desired.

The top portion of the belt 4 travels through an elongated box 17 and slides upon or close to a horizontal coil of steam-pipe 18, inclosed within the box. A fan 19 blows into one end of the box 17, the blast being discharged at the other end of the box through air-duct 20. Near the drum 2, journaled in the frame, is a wheel 21, having wings or vanes as long as the width of the belt 4, so disposed that they lightly touch the under side of the upper part of the belt 4.

22 is a wheel or drum journaled in the frame, having radially-projecting brushes 23, which when this wheel is revolved lightly brush the under side of the under part of the belt 4.

The two wheels or drums 21 22 are driven by chain 24, engaging sprockets on the shafts of the drum 2 and wheels 21 22.

Beneath that side of the drum 2 where the belt 4 passes downwardly and changes its direction is a hopper 25 the width of the machine, connected with a suitable conveyer 26, connected with a proper receptacle for the cleaned clover-seed. Beneath the brushes 23 is another hopper, 27, also connected with said receptacle. The under side of the belt 4 rests upon and travels over a scraper 28, which extends across the machine the full width of the belt and over a hopper 29.

The operation of my machine is as follows: The pulleys 6 7 being driven, motion is communicated to the belt 4, the feed mechanism, the moistening mechanism, the knocking-wheel, and the brushing-wheel. The fan is also set going and the steam-coil is heated. The belt 4 as it passes over the wheel 10 is moistened. The seed to be treated is fed onto the moistened portion of the belt. Upon coming in contact with the moisture of the belt each foul seed immediately develops a viscid substance which causes the seed to adhere to the belt. As the belt passes through the box 17 and over the heated steam-pipes the belt and the seeds are rapidly dried, the evaporated moisture being carried off by the air-blast. When the upper part of belt 4 passes above the wheel 21, the wings or vanes of the wheel lightly knock against the under side of the belt and loosen any clover-seed that may have adhered to the belt or to a neighboring buckhorn. As the belt travels downwardly over the drum 2 the clover-seeds drop into the hopper 25, the buckhorn passing on with the belt. Should any clover-seed still adhere to the belt, it is now removed by a slight touch of the revolving brushes 23 and drops into the hopper 27. The belt continuing in its course passes over the scraper 28, and all the adhering buckhorn is now scraped off and drops into hopper 29. Thus a complete separation of the clover-seed from the foul seed is effected.

The above-described machine is made the subject of a separate application for United States Letters Patent, filed June 6, 1904, Serial No. 211,317, concurrent herewith. While this machine is found in practice to be well adapted for carrying out my process, it will be obvious to skilled mechanicians that other devices, as well as modifications of the machine above described, may be employed for practicing my process without departing from the spirit of my invention.

Having described my invention, what I claim, and desire to secure by Letters Patent, is—

1. The process of separating mixed seeds, which consists in moistening the seeds, then drying the seeds upon a suitable holder, then removing the non-adhesive seeds from the holder, and then removing the adhesive seeds from the holder.

2. The process of separating mixed seeds, which consists in depositing the seeds on a moistened apron, then drying the apron and the seeds, then removing the non-adhering seeds from the apron, and then removing the adhering seeds from the apron.

In testimony whereof I affix my signature in presence of two witnesses.

THOMAS M. PRINE.

Witnesses:
CLEM V. WAGNER,
M. L. MARKS.